(12) United States Patent
Sumitani

(10) Patent No.: US 8,346,058 B2
(45) Date of Patent: Jan. 1, 2013

(54) REPLAY APPARATUS

(75) Inventor: Hideaki Sumitani, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 985 days.

(21) Appl. No.: 12/118,303

(22) Filed: May 9, 2008

(65) Prior Publication Data

US 2008/0285954 A1 Nov. 20, 2008

(30) Foreign Application Priority Data

May 18, 2007 (JP) ................................. 2007-132894

(51) Int. Cl.
H04N 5/92 (2006.01)

(52) U.S. Cl. ........ 386/245; 386/241; 386/251; 348/465; 348/467; 348/468

(58) Field of Classification Search .................. 386/126, 386/241, 245, 248–251, 261–262; 348/465, 348/467–468
See application file for complete search history.

(56) References Cited

U.S. PATENT DOCUMENTS

| | | | | |
|---|---|---|---|---|
| 6,075,550 A | * | 6/2000 | Lapierre | 725/25 |
| 6,829,582 B1 | * | 12/2004 | Barsness | 704/275 |
| 6,972,802 B2 | * | 12/2005 | Bray | 348/468 |
| 7,139,031 B1 | | 11/2006 | Bray | |
| 2003/0046579 A1 | | 3/2003 | Hayes et al. | |
| 2003/0122966 A1 | | 7/2003 | Markman et al. | |
| 2003/0206720 A1 | | 11/2003 | Abecassis | |
| 2004/0049780 A1 | * | 3/2004 | Gee | |
| 2005/0262116 A1 | * | 11/2005 | Yoo et al. | 707/100 |
| 2006/0130119 A1 | * | 6/2006 | Candelore et al. | 725/135 |
| 2007/0092223 A1 | * | 4/2007 | Yoo et al. | 386/95 |
| 2008/0085099 A1 | * | 4/2008 | Guihot | 386/95 |

FOREIGN PATENT DOCUMENTS

| | | |
|---|---|---|
| EP | 1 675 028 A2 | 6/2006 |
| EP | 1 874 045 A1 | 1/2008 |
| JP | 2003-143526 A | 5/2003 |
| WO | WO 99/34598 A1 | 7/1999 |
| WO | WO 2004/090885 A1 | 10/2004 |

OTHER PUBLICATIONS

European Office Action dated Mar. 10, 2010 (eight (8) pages).
European Search Report dated Nov. 18, 2008, (Thirteen (13) pages).

* cited by examiner

Primary Examiner — Brandon Hoffman
Assistant Examiner — Jayesh Jhaveri
(74) Attorney, Agent, or Firm — Crowell & Moring LLP

(57) ABSTRACT

Disclosed is a replay apparatus including a reading unit, a display control unit, a storage unit to store a predetermined display limited letter string and a judging unit to judge whether the predetermined display limited letter string stored in the storage unit exists in the letter string which is based on the text data constituting the predetermined replay data read by the reading unit or not, and when the judging unit judges that the predetermined display limited letter string stored in the storage unit exists in the letter string which is based on the text data constituting the predetermined replay data read by the reading unit, the display control unit carries out a predetermined process to the judged display limited letter string in order not to display the judged display limited letter string in the predetermined display apparatus.

5 Claims, 2 Drawing Sheets

REPLAY APPARATUS

BACKGROUND OF THE INVENTION

1. Field of the Invention

The present invention relates to a replay apparatus.

2. Description of Related Art

Conventionally, there is suggested a replay apparatus which can display the letter strings which are based on the text data of a closed caption in the display apparatus along with the video which is based on the video data when the text data of the closed caption is recorded in the storage medium such as the DVD (Digital Versatile Disc) or the like along with the video data (for example, see JP2003-143526A).

The data for a subtitle which corresponds to the video data is recorded in the DVD as a graphic data.

On the other hand, in the Blu-ray Disk which is the next-generation DVD, the data for subtitle which corresponds to the video data can be recorded as a graphic data and also can be recorded as a text data (text subtitle).

There is a case where the letter string (display limited letter string) which a user does not desire to display, particularly, for example, the letter string relating to a violent expression or a sexual expression which is unfavorable from an educational viewpoint and the like are recorded in the letter strings which are based on the data for a subtitle.

In such case, for example, when the parental level is set, such display limited letter string can be avoided from being displayed.

However, when the parental level is not set, such display limited letter string cannot be avoided from being displayed.

SUMMARY OF THE INVENTION

It is, therefore, a main object of the present invention to provide a replay apparatus which can avoid the display limited letter string among the letter strings which are based on the text data recorded in the Blu-ray Disk from being displayed.

According to a first aspect of the present invention, there is provided a replay apparatus comprising a reading unit to read a predetermined replay data which is constituted by at least a video data and a text data for a subtitle which corresponds to the video data, the video data and the text data being recorded in a Blu-ray Disk, a display control unit to display a video which is based on the video data and a letter string which is based on the text data in a predetermined display apparatus, the video data and the text data constituting the predetermined replay data read by the reading unit, a storage unit to store a predetermined display limited letter string and a judging unit to judge whether the predetermined display limited letter string stored in the storage unit exists in the letter string which is based on the text data constituting the predetermined replay data read by the reading unit or not, and when the judging unit judges that the predetermined display limited letter string stored in the storage unit exists in the letter string which is based on the text data constituting the predetermined replay data read by the reading unit, the display control unit carries out a predetermined process to the judged display limited letter string in order not to display the judged display limited letter string in the predetermined display apparatus.

According to a second aspect of the present invention, there is provided a replay apparatus comprising a reading unit to read a predetermined replay data which is constituted by at least a video data and a text data for a subtitle which corresponds to the video data, the video data and the text data being recorded in a Blu-ray Disk, a display control unit to display a video which is based on the video data and a letter string which is based on the text data in a predetermined display apparatus, the video data and the text data constituting the predetermined replay data read by the reading unit, a first storage unit to store a predetermined display limited letter string, a second storage unit to store a predetermined displayable letter string which corresponds to the predetermined display limited letter string stored in the first storage unit, an input unit for a user to input an arbitrary display limited letter string, a storage control unit to store the display limited letter string which is input by the input unit in the first storage unit as the predetermined display limited letter string, a judging unit to judge whether the predetermined display limited letter string stored in the first storage unit exists in the letter string which is based on the text data constituting the predetermined replay data read by the reading unit or not and a selection unit for a user to select any one among a blank letter string replacement process to replace the judged display limited letter string with a blank letter string, a displayable letter string replacement process to replace the judged display limited letter string with the predetermined displayable letter string which is stored in the second storage unit and which corresponds to the judged display limited letter string and a skipping process to skip the predetermined replay data of a predetermined time period including at least a portion which is constituted by the text data of the judged display limited letter string among the predetermined replay data read by the reading unit, as a predetermined process in order not to display the display limited letter string judged by the judging unit in the predetermined display apparatus, and when the judging unit judges that the predetermined display limited letter string stored in the first storage unit exists in the letter string which is based on the text data constituting the predetermined replay data read by the reading unit, the display control unit carries out the predetermined process which is selected by the selection unit to the judged display limited letter string.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENT

Figure 1:
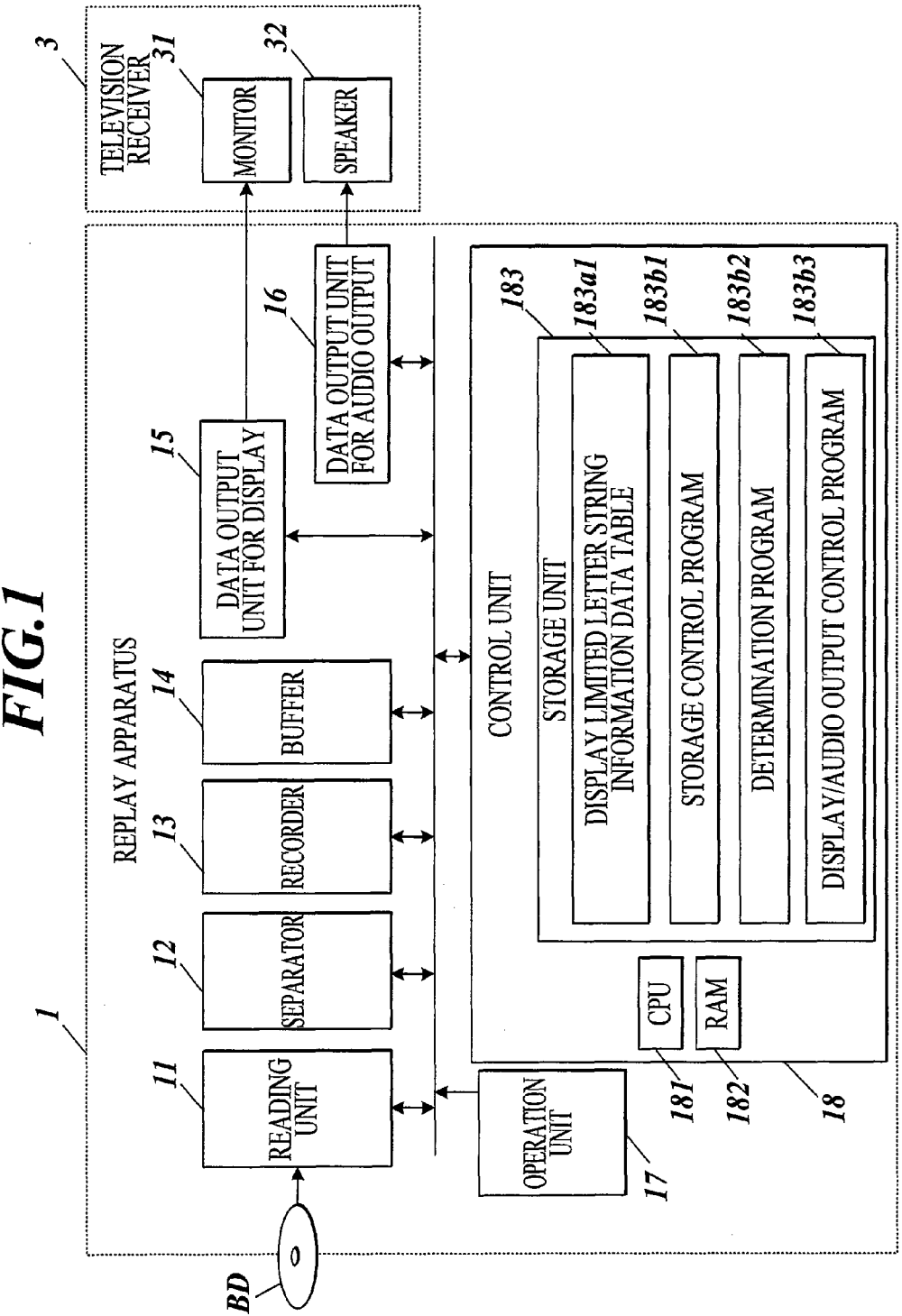
FIG. 1 is a block diagram showing a functional structure of a replay apparatus according to the present invention.

Hereinafter, the detail of the best embodiment of the replay apparatus according to the present invention will be described with reference to the drawings. Here the scope of the invention is not limited to the examples shown in the drawings.

<Structure of the Replay Apparatus>

For example, the replay apparatus 1 is an apparatus to replay a predetermined replay data which is recorded in the Blu-ray Disk BD and to output a video and an audio which are based on the replayed replay data from the television receiver 3 connected to the replay apparatus 1.

Particularly, for example, the replay apparatus 1 is structured so that the Blu-ray Disk BD is detachable. The replay apparatus 1 comprises a reading unit 11, a separator 12, a decoder 13, a buffer 14, a data output unit 15 for display, a data output unit 16 for audio output, an operation unit 17, a control unit 18 and the like as shown in FIG. 1.

Moreover, for example, the replay apparatus 1 connects to the monitor 31 of the television receiver 3 via the data output unit 15 for display and also connects to a speaker 32 of the television receiver 3 via the data output unit 16 for audio output as shown in FIG. 1.

For example, the reading unit 11 reads a predetermined replay data recorded in the Blu-ray Disk BD as a reading device according to the control signal which is input from the control unit 18.

The predetermined replay data recorded in the Blu-ray Disk BD is constituted by a video data, a text data for a subtitle which corresponds to the video data, an audio data which corresponds to the video data and the like, for example.

Here, the predetermined replay data recorded in the Blu-ray Disk BD is not limited to be constituted by the video data, the text data, the audio data and the like as long as the predetermined replay data is constituted by at least the video data and the text data.

For example, the separator 12 separates the replay data read by the reading unit 11 into the video data, the text data, the audio data and the like according to the control signal which is input from the control unit 18.

For example, the decoder 13 carries out a predetermined process such as decoding and the like to each of the video data, the text data, the audio data and the like which are separated by the separator 12 according to the control signal which is input from the control unit 18.

For example, the buffer 14 sequentially stores the video data, the text data, the audio data and the like in which the predetermined process is carried out by the decoder 13 according to the control signal which is input from the control unit 18.

The data output unit 15 for display outputs the video data and the text data stored in the buffer 14 to the monitor 31 according to the control signal which is input from the control unit 18.

The data output unit 16 for audio output outputs the audio data stored in the buffer 14 to the speaker 32 according to the control signal which is input from the control unit 18.

For example, as a predetermined display device, the monitor 31 displays the video which is based on the video data and the letter string which is based on the text data. The video data and the text data are input from the data output unit 15 for display.

For example, the speaker 32 outputs the audio which is based on the audio data input from the data output unit 16 for audio output.

The operation unit 17 is constituted by operation buttons (omitted from the drawing) provided on the outside surface of the replay apparatus 1, a remote controller (omitted from the drawing) for the replay apparatus 1, a remote control receiver (omitted from the drawing) which can communicate with the remote controller and the like, for example. For example, when the operation unit 17 is operated by a user, various types of signals associated with the operation are output to the control unit 18.

In particular, for example, the operation unit 17 is operated as an input unit when a user inputs an arbitrary display limited letter string. Further, for example, the operation unit 17 is operated when a user instructs the operation unit 17 to delete the display limited letter string which is stored in the display limited letter string information data table 183a1.

Moreover, for example, the operation unit 17 is operated when a user inputs an arbitrary displayable letter string which corresponds to the display limited letter string stored in the display limited letter sting information data table 183a1. Further, for example, the operation unit 17 is operated when a user instructs the operation unit 17 to delete the displayable letter string which is stored in the display limited letter string information data table 183a1.

Moreover, for example, the operation unit 17 is operated when a user inputs an arbitrary weighting which corresponds to the display limited letter string stored in the display limited letter string information data table 183a1. Further, for example, the operation unit 17 is used when the weighting which is stored in the display limited letter string information data table 183a1 is to be deleted.

Moreover, for example, the operation unit 17 is operated as a selecting device when a user selects a type of a predetermined process which is carried out in order not to display the display limited letter string in the monitor 31. Here, selecting of the type of the predetermined process can be carried out before the replay data recorded in the Blu-ray Disk BD is replayed or can be carried out in the middle of the replay.

Here, for example, the blank letter string replacement process, the displayable letter string replacement process and the skipping process are the types of the predetermined process.

For example, the blank letter string replacement process is a process to replace the display limited letter string with a blank letter string.

For example, the displayable letter string replacement process is a process to replace the display limited letter string with a displayable letter string which corresponds to the display limited letter string.

For example, the skipping process is a process to skip the predetermined replay data of the predetermined time period (hereinafter, called "skip time") including at least the portion which is constituted by the text data of the display limited letter string among the predetermined replay data read by the reading unit 11.

Further, for example, in case that the skipping process is selected as the type of the predetermined process, the operation unit 17 is operated when a user selects the adjustment method for the skip time in the skipping process. Here, selecting of the adjustment method for the skip time can be carried out before the replay data recorded in the Blu-ray Disk BD is replayed or can be carried out in the middle of the replay.

Here, for example, there are the weighting adjustment method and the frequency adjustment method in the adjustment method for the skip time.

For example, the weighting adjustment method is a method to adjust the length of the skip time according to the weighting of the display limited letter string.

For example, the frequency adjustment method is a method to adjust the length of the skip time according to the frequency of being judged that the display limited letter string exists.

For example, the control unit 18 comprises the CPU (Central Processing Unit) 181, the RAM (Random Access Memory) 182, the storage unit 183 and the like as shown in FIG. 1.

For example, the CPU 181 carries out various types of control operations according to various types of programs for the replay apparatus 1 which are stored in the storage unit 183.

For example, the RAM 182 comprises the program storage area to expand the process programs and the like which are to be executed by the CPU 181, the data storage area to store the input data and the process result which is obtained when the above process programs are executed and the like.

For example, the storage unit 183 stores the system program which is executable in the replay apparatus 1, various types of process programs which are executable by the system program, the data which is used when the various types of process programs are to be executed, the data of the process result which is arithmetically processed by the CPU 181 and the like. Here, the programs are stored in the storage unit 183 in a form of program code which is readable by a computer.

In particular, for example, the storage unit 183 stores the display limited letter string information data table 183*a*1, the storage control program 183*b*1, the judging program 183*b*2, the display/audio output control program 183*b*3 and the like as shown in FIG. 1.

For example, the display limited letter string information data table 183*a*1 stores the predetermined display limited letter string in which a predetermined weighting is carried out as the storage device (the first storage device), and also stores the predetermined displayable letter string which corresponds to the stored predetermined display limited letter string as the second storage device.

In particular, for example, the display limited letter string information data table 183*a*1 stores a plurality of (may be one) display limited letter strings, the displayable letter string which corresponds to each display limited letter string, the weighting which corresponds to each display limited letter string and the like.

Here, for example, a letter string which is judged as not favorable from an educational viewpoint in general, a letter string which a user judged that he/she does not desire to display in the monitor 31 and the like are stored in the display limited letter string information data table 183*a*1 as display limited letter strings.

Moreover, for example, the letter string which is judged as favorable from an educational viewpoint in general and which can replace the corresponding display limited letter string, the letter string which a user judged as being acceptable to be displayed in the monitor 31 instead of the corresponding display limited letter string and the like are stored in the display limited letter string information data table 183*a*1 as displayable letter strings.

Moreover, for example, the weightings which are set according to the level of unfavorableness of the corresponding display limited letter string from an educational viewpoint, the level of undesirableness to display the corresponding display limited letter string in the monitor 31 and the like are stored in the display limited letter string information data table 183*a*1 as the weightings. In particular, for example, the weighting becomes greater as the level of unfavorableness of the corresponding display limited letter string from an educational viewpoint, the level of undesirableness to display the corresponding display limited letter string in the monitor 31 and the like become greater.

For example, the storage control program 183*b*1 stores the display limited letter string which is input by a user operating the operation unit 17 in the display limited letter string information data table 183*a*1 as a predetermined display limited letter string, and also makes the CPU 181 realize the function to delete the display limited letter string which is instructed to be deleted by a user operating the operation unit 17 from the display limited letter string information data table 183*a*1.

The CPU 181 functions as a storage control device by executing the storage control program 183*b*1.

Moreover, for example, the storage control program 183*b*1 stores the displayable letter string which corresponds to the display limited letter string stored in the display limited letter string information data table 183*a*1 and which is input by a user operating the operation unit 17 in the display limited letter string information data table 183*a*1 as a predetermined displayable letter string so as to be corresponded to the display limited letter string, and also makes the CPU 181 realize the function to delete the displayable letter string which is instructed to be deleted by a user operating the operation unit 17 from the display limited letter string information data table 183*a*1.

For example, the storage control program 183*b*1 stores the weighting which corresponds to the display limited letter string stored in the display limited letter string information data table 183*a*1 and which is input by a user operating the operation unit 17 in the display limited letter string information data table 183*a*1 so as to be corresponded to the display limited letter string, and also makes the CPU 181 realize the function to delete the weighting which is instructed to be deleted by a user operating the operation unit 17 from the display limited letter string information data table 183*a*1.

For example, the judging program 183*b*2 detects the predetermined display limited letter string stored in the display limited letter string information data table 183*a*1 among the letter strings which are based on the text data in which a predetermined process is carried out by the decoder 13. Thereby, the judging program 183*b*2 makes the CPU 181 realize the function to judge whether the predetermined display limited letter string stored in the display limited letter string information data table 183*a*1 exists in the letter strings which are based on the text data which constitutes the predetermined replay data read by the reading unit 11 or not.

The CPU 181 functions as a judging device by executing the judging program 183*b*2.

For example, the display/audio output control program 183*b*3 makes the CPU 181 realize the function to replay the predetermined replay data recorded in the Blu-ray Disk BD.

In particular, for example, the CPU 181 inputs the control signal to the reading unit 11, the separator 12, the decoder 13, the buffer 14, the data output unit 15 for display, the data output unit 16 for audio output and the like. Further, the CPU 181 displays the video which is based on the video data and the letter string which is based on the text data. The video data and the text data constitute the predetermined replay data read by the reading unit 11. The CPU 181 outputs the audio based on the audio data constituting the predetermined replay data read by the reading unit 11 to the speaker 32.

Moreover, for example, when it is judged that the predetermined display limited letter string stored in the display limited letter string information data table 183*a*1 exits in the letter strings which are based on the text data constituting the predetermined replay data read by the reading unit 11 by the CPU 181 which executed the judged program 183*b*2, the display/audio output control program 183*b*3 makes the CPU 181 realize the function to carry out the predetermined process to the judged display limited letter string in order not to display the judged display limited letter string in the monitor 31.

In particular, for example, when the blank letter string replacement process is selected as the type of the predetermined process by a user operating the operation unit 17, the CPU 181 replaces the judged display limited letter string among the letter strings which are based on the text data stored in the buffer 14 with the blank letter string, and outputs the video data and the text data in which the display limited letter string is replaced with the blank letter string which are stored in the buffer 14 to the data output unit for display 15 and outputs the audio data stored in the buffer 14 to the data output unit for audio output 16.

When the display limited letter string is replaced with the blank letter string, nothing will be displayed in the portion of the screen of the monitor 31 in which the display limited letter string is supposed to be displayed.

Moreover, for example, when the displayable letter string replacement process is selected as the type of the predetermined process by a user operating the operation unit 17, for example, the CPU 181 replaces the judged display limited letter string among the letter strings which are based on the text data stored in the buffer 14 with the predetermined displayable letter string stored in the display limited letter string information data table 183a1 which corresponds to the judged display limited letter string, outputs the video data and the text data in which the display limited letter string is replaced with the displayable letter string which are stored in the buffer 14 to the data output unit for display 15, and outputs the audio data stored in the buffer 14 to the data output unit for audio output 16.

When the display limited letter string is replaced with the displayable letter string, the displayable letter string will be displayed in the portion of the screen of the monitor 31 in which the display limited letter string is supposed to be displayed.

Here, when the displayable letter string which corresponds to the judged display limited letter string is not stored in the display limited letter string information data table 183a1, the CPU 181 replaces the judged display limited letter string with the blank letter string, for example.

Moreover, for example, when the skipping process is selected as the type of the predetermined process by a user operating the operation unit 17, the CPU 181 skips the replay data of the predetermined time period including at least a portion constituted by the text data of the judged display limited letter string among the predetermined replay data read by the reading unit 11. That is, for example, the CPU 181 skips the skip time worth of video data and text data among the video data and the text data stored in the buffer 14 and outputs the data to the data output unit for display 15, and skips the skip time worth of data within the audio data stored in the buffer 14 and outputs the data to the data output unit for audio output 16.

When the video data, the text data and the audio data are skipped, the subtitle which includes at least the judged display limited letter string and the video and the audio which correspond to the subtitle will not be displayed in the monitor 31 and will not be output from the speaker 32.

Here, for example, when the weighting adjustment method is selected as the adjustment method for the skip time by a user operating the operation unit 17, the CPU 181 adjusts the length of the skip time according to the weighting which is stored in the display limited letter string information data table 183a1 and which corresponds to the judged display limited letter string, for example.

In particular, for example, when the weighting becomes greater as the level of unfavorableness of the display limited letter string from an educational viewpoint and the level of undesirableness to display the display limited letter string in the monitor 31 become greater, the CPU 181 adjusts so that the skip time becomes longer as the weighting becomes greater, for example. More in particular, for example, when the weighting is in three levels of "1", "2" and "3", the skip time of "10 seconds" corresponds to the weighting of "1", the skip time of "20 seconds" corresponds to the weighting of "2", and the skip time of "30 seconds" corresponds to the weighting of "3", for example.

Here, when the weighting which corresponds with the judged letter string is not stored in the display limited letter string information data table 183a1, the CPU 181 skips the letter strings for the skip time which is set in advance, for example.

Moreover, for example, when the frequency adjustment method is selected as the adjustment method for the skip time by a user operating the operation unit 17, the CPU 181 counts the frequency of being judged that the display limited letter string exists by the CPU 181 which executed the judging program 183b2 and adjusts the length of the skip time according to the counted frequency, for example. In particular, the CPU 181 adjusts the skip time so as to be longer as the frequency of being judged that the display limited letter string exists increases, for example.

In particular, for example, the CPU 181 stores the judged time in the RAM 182 every time when it is judged that the display limited letter string exists by the CPU 181 which executed the judging program 183b2, and adjusts the length of the skip time according to the calculated value by calculating the number of times of judgment (=frequency of being judged) for the hour unit based on the judged time.

Here, the frequency may be the frequency of being judged that the same display limited letter strings exist or may be the frequency of being judged that any one of the display limited letter strings exit, for example.

The CPU 181 functions as a display control device by executing the display/audio output control program 183b3.

<Replay Process>

Figure 2:
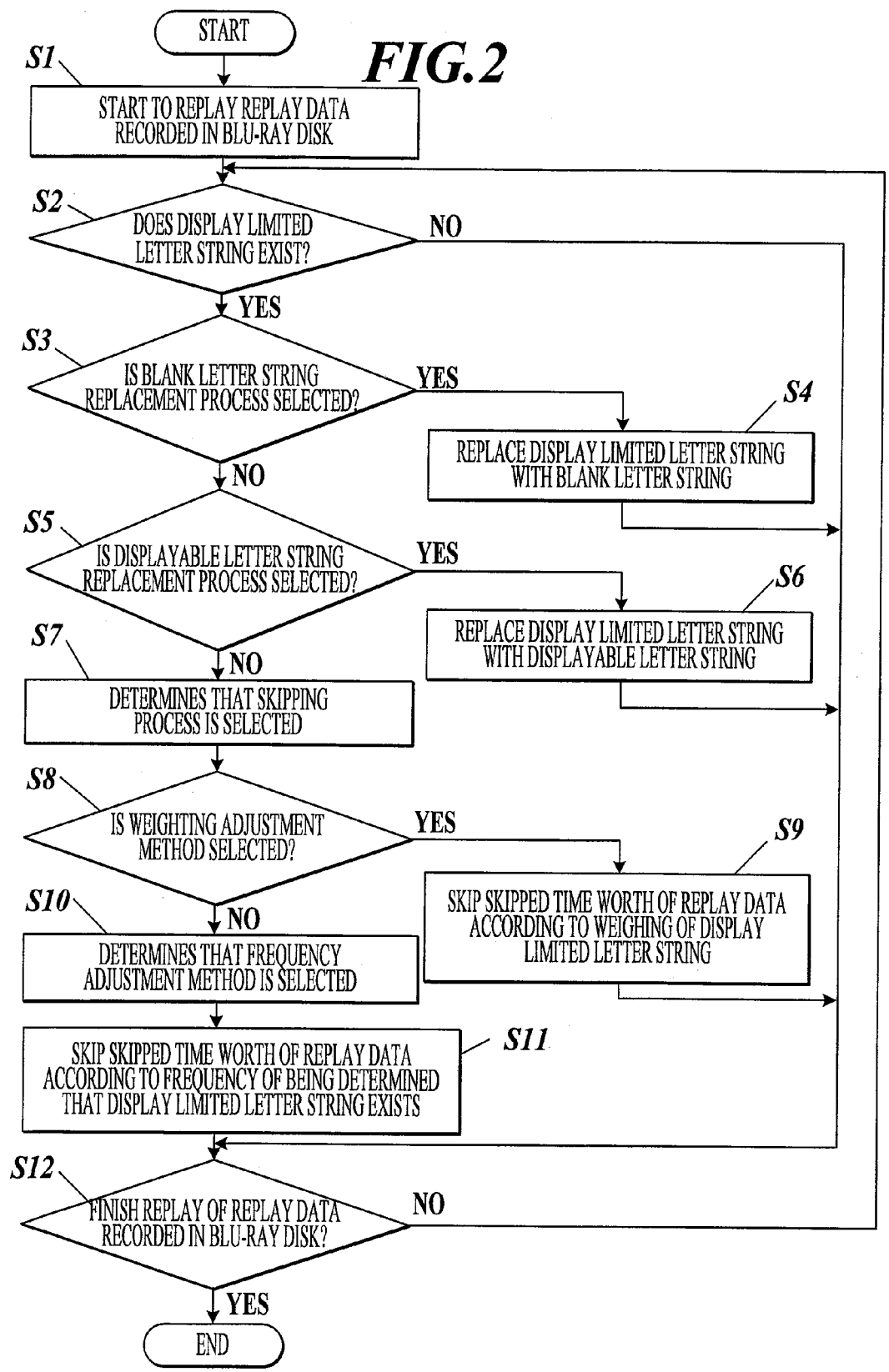
FIG. 2 is a flowchart to explain the process relating to a replay of a replay data recorded in the Blu-ray Disk by the replay apparatus according to the present invention.

The process relating to the replay of the replay data recorded in the Blu-ray Disk BD by the replay apparatus 1 will be described with reference to the flowchart of FIG. 2.

When it is instructed to start the replay of the predetermined replay data recorded in the Blu-ray Disk BD by a user operating the operation unit 17, the CPU 181 executes the display/audio output control program 183b3 and starts the replay of the predetermined replay data recorded in the Blu-ray Disk BD (step S1).

Next, the CPU 181 executes the judging program 183b2 and judges whether the predetermined display limited letter string stored in the display limited letter string information data table 183a1 exists in the letter strings which are based on the text data constituting the predetermined replay data read by the reading unit 11 or not (step S2).

When it is judged that the predetermined display limited letter string stored in the display limited letter string information data table 183a1 does not exist in the letter strings which are based on the text data constituting the predetermined replay data read by the reading unit 11 (step S2; No), the CPU 181 proceeds to the process of step S12.

On the other hand, when it is judged that the predetermined display limited letter string stored in the display limited letter string information data table 183a1 exists in the letter strings which are based on the text data constituting the predetermined replay data read by the reading unit 11 (step S2; Yes), the CPU 181 judges whether the blank letter string replacement process is selected as the type of the predetermined process by a user operating the operating unit 17 or not (step S3).

When it is judged that the blank letter string replacement process is selected as the type of the predetermined process in step S3 (step S3; Yes), the CPU 181 replaces the display limited letter string which is judged in step S2 with the blank letter string (step S4), and proceeds to the process of step S12.

On the other hand, when it is judged that the blank letter string replacement process is not selected as the type of the predetermined process in step S3 (step S3; Yes), the CPU 181 judges whether the displayable letter string replacement process is selected as the type of the predetermined process by a user operating the operation unit 17 or not (step S5).

When it is judged that the displayable letter string replacement process is selected as the type of the predetermined process in step S5 (step S5; Yes), the CPU 181 replaces the display limited letter string which is judged in step S2 with the predetermined displayable letter string which is stored in the display limited letter string information data table 183*a*1 and which corresponds to the judged display limited letter string (step S6), and proceeds to the process of step S12.

On the other hand, when it is judged that the displayable letter string replacement process is not selected as the type of the predetermined process in step S5 (step S5; No), the CPU 181 judges whether the skipping process is selected as the type of the predetermined process by a user operating the operation unit 17 or not (step S7).

Next, the CPU 181 judges whether the weighting adjustment method is selected as the adjustment method for the skip time by a user operating the operation unit 17 or not (step S8).

When it is judged that the weighting adjustment method is selected as the adjustment method for the skip time in step S8 (step S8; Yes), the CPU 181 skips the skip time worth of the predetermined replay data according to the weighting of the display limited letter string which is judged in step S2 among the predetermined replay data (video data, text data and audio data) read by the reading unit 11 (step S9) and proceeds to the process of step S12.

On the other hand, when it is judged that the weighting adjustment method is not selected as the adjustment method for the skip time in step S8 (step S8; No), the CPU 181 judges that the frequency adjustment method is selected as the adjustment method for the skip time by a user operating the operation unit 17 (step S10) and skips the skip time worth of the replay data according to the frequency of being judged that the display limited letter string exists in the predetermined replay data (video data, text data and audio data) read by the reading unit 11.

Subsequently, the CPU 181 judges whether to finish the replay of the predetermined replay data recorded in the Blu-ray Disk BD or not (step S12). In particular, the CPU 181 judges to finish the replay when it is instructed by a user operating the operation unit 17 or when all of the predetermined replay data recorded in the Blu-ray Disk BD is replayed, for example.

When it is judged not to finish the replay of the predetermined replay data recorded in the Blu-ray Disk BD in step S12 (step S12; No), the CPU 181 repeats the processes which come after step S2.

On the other hand, when it is judged to finish the replay of the predetermined replay data recorded in the Blu-ray Disk BD in step S12 (step S12; Yes), the CPU 181 finishes the process.

The above described replay apparatus 1 of the present invention comprises the reading unit 11 to read the predetermined replay data which is constituted at least by the video data and the text data for subtitle corresponding to the video data and which is recorded in the Blu-ray Disk BD, the CPU 181 which executed the display/audio output control program 183*b*3 to make the monitor 31 display the video which is based on the video data and the letter string which is based on the text data, wherein the video data and the text data constitute the predetermined replay data read by the reading unit 11, the display limited letter string information data table 183*a*1 to store the predetermined display limited letter string and the CPU 181 which executed the judging program 183*a*2 to judge whether the predetermined display limited letter string stored in the display limited letter string information data table 183*a*1 exists in the letter strings which are based on the text data constituting the predetermined replay data read by the reading unit 11. When it is judged that the predetermined display limited letter string stored in the display limited letter string information data table 183*a*1 exists in the letter strings which are based on the text data constituting the predetermined replay data read by the reading unit 11 by the CPU 181 which executed the judging program 183*b*2, the CPU 181 which executed the display/audio output control program 183*b*3 can carry out a predetermined process to the judged display limited letter string in order not to display the judged display limited letter string in the monitor 31.

That is, when the predetermined display limited letter string exists in the letter string which is based on the text data for a subtitle recorded in the Blu-ray Disk BD, display of the display limited letter string within the letter strings which are based on the text data recorded in the Blu-ray Disk BD can be avoided because a predetermined process can be carried out to the display limited letter string so as not to be displayed in the monitor 31.

Further, according to the replay apparatus 1, the CPU 181 which executed the display/audio output control program 183*b*3 can replace the judged display limited letter string with the blank letter string as a predetermined process.

That is, display of the display limited letter string can be surely avoided because nothing will be displayed in a portion of the screen of the monitor 31 where the display limited letter string is supposed to be displayed.

Moreover, according to the replay apparatus 1, the predetermined displayable letter string which corresponds to the predetermined display limited letter string can be stored in the display limited letter string information data table 183*a*1, and the CPU 181 which executed the display/audio output control program 183*a*3 can replace the judged display limited letter string with the predetermined displayable letter string which is stored in the display limited letter string information data table 183*a*1 and which corresponds to the judged display limited letter string as a predetermined process.

That is, display of the display limited letter string can be surely avoided because the displayable letter string will be displayed in the portion of the screen of the monitor 31 where the display limited letter string is supposed to be displayed.

Furthermore, according to the replay apparatus 1, the CPU 181 which executed the display/audio output control program 183*b*3 can skip the skip time worth of predetermined replay data including at least a portion which is constituted by the text data of the judged display limited letter string among the predetermined replay data read by the reading unit 11 as a predetermined process.

That is, display of the display limited letter string can be surely avoided because the subtitle which at least includes the judged display limited letter string, the video which corresponds to the subtitle and the audio which corresponds to the subtitle will not be displayed in the monitor 31 or will not be output from the speaker 32.

Moreover, according to the replay apparatus 1, a predetermined weighting is carried out to the predetermined display limited letter string stored in the display limited letter string information data table 183*a*1, and the CPU 181 which executed the display/audio output control program 183*b*3 can adjust the length of the skip time to skip according to the weighting of the judged display limited letter string.

That is, for example, when the weighting becomes greater as the level of unfavorableness of the display limited letter string from an educational viewpoint, the level of undesirableness to display the display limited letter string in the monitor 31 or the like becomes greater and when the skip time is adjusted so as to be longer as the weighting becomes greater, display of the display limited letter string can be surely avoided because the skip time becomes longer as the level of unfavorableness of the display limited letter string from an educational viewpoint, the level of undesirableness to display the display limited letter string in the monitor 31 or the like becomes greater.

Further, according to the replay apparatus 1, the CPU 181 which executed the display/audio output control program 183b3 counts the frequency of being judged that the display limited letter sting exists by the CPU 181 which executed the judging program 183b2 and can adjust the length of the skip time to skip according to the counted frequency.

That is, for example, when the skip time is adjusted so as to be longer as the frequency of being judged that the display limited letter string exists increases, display of the display limited letter string can be surely avoided because the skip time becomes longer as the frequency of being judged that the display limited letter string exists increases.

Furthermore, the replay apparatus 1 comprises the operation unit 17 for a user to input an arbitrary display limited letter string and the CPU 181 which executed the storage control program 183b1 to store the display limited letter string which is input by a user operating the operation unit 17 in the display limited letter string information data table 183a1 as a predetermined display limited letter string.

Accordingly, when there is a letter string which a user does not desire to display in the monitor 31, the display limited letter string can be customized because a user can register the letter string which he/she does not desire to display in the monitor 31 in the display limited letter string information data table 183a1 as a display limited letter string.

Moreover, according to the replay apparatus 1, a user can select any one among the blank letter string replacement process which replaces the judged display limited letter string with the blank letter string, the displayable letter string replacement process which replaces the judged display limited letter string with a predetermined displayable letter string which is stored in the display limited letter string information data table 183a1 and which corresponds to the judged display limited letter string and the skipping process which skips the predetermined replay data of the predetermined time period which at least includes the portion constituted by the text data of the judged display limited letter string within the predetermined replay data read by the reading unit 11 as a predetermined process in order not to display the display limited letter string judged by the CPU 181 which executed the judging program 183b2 by a user operating the operation unit 17.

Accordingly, the apparatus is convenient to use because a user can select the desired predetermined process.

Here, the present invention is not limited to the above described embodiment, and can be arbitrarily changed within the scope of the invention.

The replay apparatus 1 may be integrally structured with the television receiver 3.

The replay apparatus 1 does not need to be structured so as to be able to execute the three processes of the blank letter string replacement process, the displayable letter string replacement process and the skipping process as the predetermined process. The replay apparatus 1 may be structured so as to be able to execute the process of any one or two among the three processes.

Moreover, the predetermined process is not limited to the blank letter string replacement process, the displayable letter string replacement process and the skipping process, and the predetermined process is arbitrary as long as it is a process for not displaying the display limited letter string in the monitor 31.

The replay apparatus 1 does not need to be structured so as to be able to execute the two methods which are the weighting adjustment method and the frequency adjustment method as the adjustment method for the skip time. The replay apparatus 1 may be structured so as to be able to execute any one of the two methods.

Further, the adjustment method for the skip time is not limited to the weighting adjustment method and the frequency adjustment method, and is arbitrary as long as it is a method for adjusting the skip time.

Furthermore, the skip time does not need to be adjusted, and the skip time may be a certain period of time which is set in advance.

According to a first aspect of the preferred embodiment of the present invention, there is provided a replay apparatus comprising a reading unit to read a predetermined replay data which is constituted by at least a video data and a text data for a subtitle which corresponds to the video data, the video data and the text data being recorded in a Blu-ray Disk, a display control unit to display a video which is based on the video data and a letter string which is based on the text data in a predetermined display apparatus, the video data and the text data constituting the predetermined replay data read by the reading unit, a storage unit to store a predetermined display limited letter string and a judging unit to judge whether the predetermined display limited letter string stored in the storage unit exists in the letter string which is based on the text data constituting the predetermined replay data read by the reading unit or not, and when the judging unit judges that the predetermined display limited letter string stored in the storage unit exists in the letter string which is based on the text data constituting the predetermined replay data read by the reading unit, the display control unit carries out a predetermined process to the judged display limited letter string in order not to display the judged display limited letter string in the predetermined display apparatus.

Preferably, the display control unit replaces the judged display limited letter string with a blank letter string as the predetermined process.

Preferably, the replay apparatus further comprises a second storage unit to store a predetermined displayable letter string which corresponds to the predetermined display limited letter string stored in the storage unit, and the display control unit replaces the judged display limited letter string with the predetermined displayable letter string stored in the second storage unit which corresponds to the judged display limited letter string as the predetermined process.

Preferably, the display control unit skips the predetermined replay data of a predetermined time period including at least a portion which is constituted by a text data of the judged display limited letter string among the predetermined replay data read by the reading unit as the predetermined process.

Preferably, a predetermined weighting is carried out to the predetermined display limited letter string stored in the storage unit, and the display control unit adjusts a length of the predetermined time period to skip according to the weighting of the judged display limited letter string.

Preferably, the display control unit counts frequency of being judged that the display limited letter string exists by the judging unit and adjusts a length of the predetermined time period to skip according to the counted frequency.

Preferably, the replay apparatus further comprises an input unit for a user to input an arbitrary display limited letter string and a storage control unit to store the display limited letter string which is input by the input unit in the storage unit as the predetermined display limited letter string.

According to a second aspect of the preferred embodiment of the present invention, there is provided a replay apparatus comprising a reading unit to read a predetermined replay data which is constituted by at least a video data and a text data for a subtitle which corresponds to the video data, the video data and the text data being recorded in a Blu-ray Disk, a display control unit to display a video which is based on the video data and a letter string which is based on the text data in a predetermined display apparatus, the video data and the text data constituting the predetermined replay data read by the reading unit, a first storage unit to store a predetermined display limited letter string, a second storage unit to store a predetermined displayable letter string which corresponds to the predetermined display limited letter string stored in the first storage unit, an input unit for a user to input an arbitrary display limited letter string, a storage control unit to store the display limited letter string which is input by the input unit in the first storage unit as the predetermined display limited letter string, a judging unit to judge whether the predetermined display limited letter string stored in the first storage unit exists in the letter string which is based on the text data constituting the predetermined replay data read by the reading unit or not and a selection unit for a user to select any one among a blank letter string replacement process to replace the judged display limited letter string with a blank letter string, a displayable letter string replacement process to replace the judged display limited letter string with the predetermined displayable letter string which is stored in the second storage unit and which corresponds to the judged display limited letter string and a skipping process to skip the predetermined replay data of a predetermined time period including at least a portion which is constituted by the text data of the judged display limited letter string among the predetermined replay data read by the reading unit, as a predetermined process in order not to display the display limited letter string judged by the judging unit in the predetermined display apparatus, and when the judging unit judges that the predetermined display limited letter string stored in the first storage unit exists in the letter string which is based on the text data constituting the predetermined replay data read by the reading unit, the display control unit carries out the predetermined process which is selected by the selection unit to the judged display limited letter string.

According to the first aspect and the second aspect of the present invention, a replay apparatus comprises a reading unit to read a predetermined replay data which is constituted by at least a video data and a text data for a subtitle which corresponds to the video data, the video data and the text data being recorded in a Blu-ray Disk, a display control unit to display a video which is based on the video data and a letter string which is based on the text data in a predetermined display apparatus, the video data and the text data constituting the predetermined replay data read by the reading unit and a judging unit to judge whether the predetermined display limited letter string exists in the letter string which is based on the text data constituting the predetermined replay data read by the reading unit or not, and when the judging unit judges that the predetermined display limited letter string exists in the letter string which is based on the text data constituting the predetermined replay data read by the reading unit, the display control unit carries out a predetermined process to the judged display limited letter string in order not to display the judged display limited letter string in the predetermined display apparatus.

That is, when the predetermined display limited letter string exists in the letter strings which are based on the text data for a subtitle recorded in the Blu-ray Disk, the predetermined process can be carried out to the display limited letter string in order not to display the display limited letter string in the display apparatus. Therefore, the display limited letter string among the letter strings which are based on the text data recorded in the Blu-ray Disk can be avoided from being displayed.

The entire disclosure of Japanese Paten Application No. 2007-132894 filed on May 18, 2007 including description, claims drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A replay apparatus, comprising:
a reading unit to read a predetermined replay data which is constituted by at least a video data and a text data for a subtitle which corresponds to the video data, the video data and the text data being recorded in a recording medium;
a display control unit to display a video which is based on the video data and a letter string which is based on the text data in a predetermined display apparatus, the video data and the text data constituting the predetermined replay data read by the reading unit;
a storage unit to store a predetermined display limited letter string; and
a judging unit to judge whether the predetermined display limited letter string stored in the storage unit exists in the letter string which is based on the text data constituting the predetermined replay data read by the reading unit or not, wherein
when the judging unit judges that the predetermined display limited letter string stored in the storage unit exists in the letter string which is based on the text data constituting the predetermined replay data read by the reading unit, the display control unit carries out a predetermined process to the judged display limited letter string in order not to display the judged display limited letter string in the predetermined display apparatus,
the display control unit skips the predetermined replay data of a predetermined time period including at least a portion which is constituted by a text data of the judged display limited letter string among the predetermined replay data read by the reading unit as the predetermined process, and
a predetermined weighting is carried out to the predetermined display limited letter string stored in the storage unit and the display control unit adjusts a length of the predetermined time period to skip according to the weighting of the judged display limited letter string or the display control unit counts frequency of being judged that the display limited letter string exists by the judging unit within a certain period of time and adjusts a length of the predetermined time period to skip according to the counted frequency within the certain period of time.

2. The replay apparatus as claimed in claim 1, wherein the display control unit replaces the judged display limited letter string with a blank letter string as the predetermined process.

3. The replay apparatus as claimed in claim 1 further comprising a second storage unit to store a predetermined displayable letter string which corresponds to the predetermined display limited letter string stored in the storage unit, wherein the display control unit replaces the judged display limited letter string with the predetermined displayable letter string stored in the second storage unit which corresponds to the judged display limited letter string as the predetermined process.

4. The replay apparatus as claimed in claim 1, further comprising:
   an input unit for a user to input an arbitrary display limited letter string; and
   a storage control unit to store the display limited letter string which is input by the input unit in the storage unit as the predetermined display limited letter string.

5. A replay apparatus, comprising:
   a reading unit to read a predetermined replay data which is constituted by at least a video data and a text data for a subtitle which corresponds to the video data, the video data and the text data being recorded in a recording medium;
   a display control unit to display a video which is based on the video data and a letter string which is based on the text data in a predetermined display apparatus, the video data and the text data constituting the predetermined replay data read by the reading unit;
   a first storage unit to store a predetermined display limited letter string;
   a second storage unit to store a predetermined displayable letter string which corresponds to the predetermined display limited letter string stored in the first storage unit;
   an input unit for a user to input an arbitrary display limited letter string;
   a storage control unit to store the display limited letter string which is input by the input unit in the first storage unit as the predetermined display limited letter string;
   a judging unit to judge whether the predetermined display limited letter string stored in the first storage unit exists in the letter string which is based on the text data constituting the predetermined replay data read by the reading unit or not; and
   a selection unit for a user to select any one among a blank letter string replacement process to replace the judged display limited letter string with a blank letter string, a displayable letter string replacement process to replace the judged display limited letter string with the predetermined displayable letter string which is stored in the second storage unit and which corresponds to the judged display limited letter string and a skipping process to skip the predetermined replay data of a predetermined time period including at least a portion which is constituted by the text data of the judged display limited letter string among the predetermined replay data read by the reading unit, as a predetermined process in order not to display the display limited letter string judged by the judging unit in the predetermined display apparatus, wherein
   when the judging unit judges that the predetermined display limited letter string stored in the first storage unit exists in the letter string which is based on the text data constituting the predetermined replay data read by the reading unit, the display control unit carries out the predetermined process which is selected by the selection unit to the judged display limited letter string, and
   a predetermined weighting is carried out to the predetermined display limited letter string stored in the first storage unit and the display control unit adjusts a length of the predetermined time period to skip according to the weighting of the judged display limited letter string or the display control unit counts frequency of being judged that the display limited letter string exists by the judging unit within a certain period of time and adjusts a length of the predetermined time period to skip according to the counted frequency within the certain period of time.

* * * * *